United States Patent

[11] 3,604,342

| [72] | Inventor | Jess L. Harding<br>1834 South 13th Street, Kansas City, Kans. 66103 |
|---|---|---|
| [21] | Appl. No. | 800,198 |
| [22] | Filed | Feb. 18, 1969 |
| [45] | Patented | Sept. 14, 1971 |

[54] CONE MOLD FOR TORTILLAS
7 Claims, 8 Drawing Figs.

[52] U.S. Cl. .................................................. 99/426
[51] Int. Cl. .................................................. A47j 43/18
[50] Field of Search ........................................ 99/403,
426, 428, 441; 107/1.4, 19, 54

[56] References Cited
UNITED STATES PATENTS

| 2,957,404 | 10/1960 | Richardson | 99/426 |
| 3,020,826 | 2/1962 | Silva | 99/426 |
| 3,424,076 | 1/1969 | Bernatz et al. | 99/426 |

Primary Examiner—Henry S. Jaudon
Attorney—John A. Hamilton

ABSTRACT: A mold for forming a tortilla in a cone form for better containing tacos or other loose food filling including moisture, said mold consisting of a hollow, perforated metallic conical body about which a tortilla patty may be wrapped in cone form so as to close the cone form at its apex and with opposed edges thereof overlapping, a perforated, semicylindrical clamp adapted to press the overlapping portions of said tortilla patty to hold it in place on the cone body, and means for suspending said mold in a vessel of hot cooking oil to cook said patty, said mold body being compressible to facilitate release of the cooked patty from the mold body.

PATENTED SEP 14 1971
3,604,342
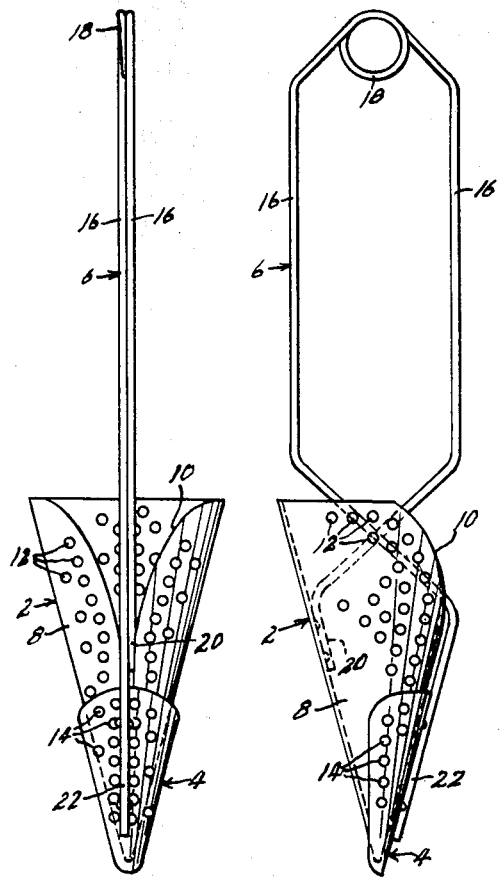
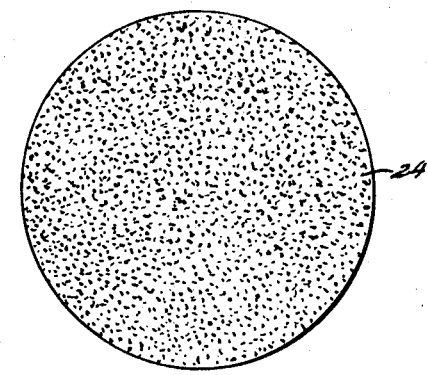
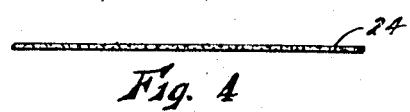
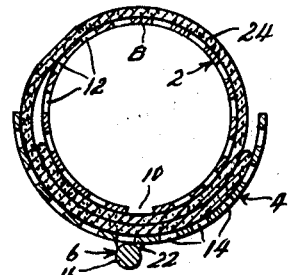
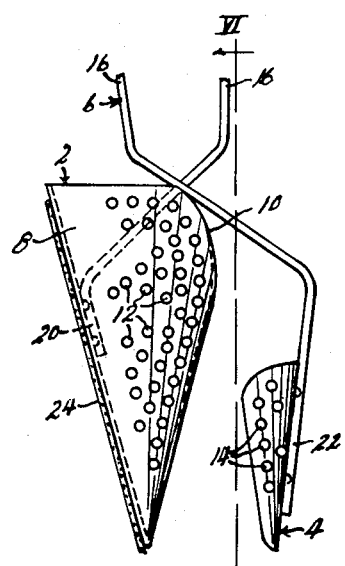
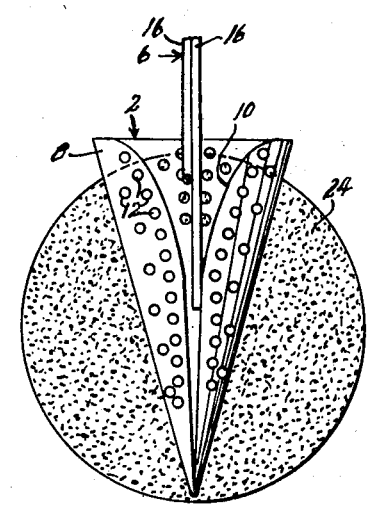
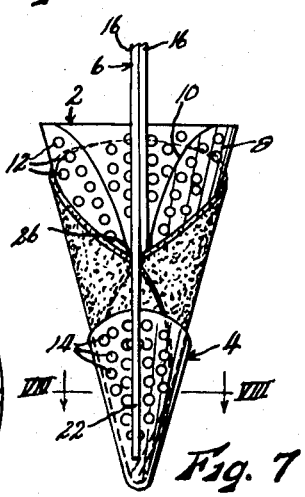
INVENTOR.
Jess L. Harding
BY John A. Hamilton
Attorney.

CONE MOLD FOR TORTILLAS

This invention relates to a new useful improvements in cooking apparatus, and has particular reference to a mold suitable for forming a tortilla patty in conical form while it is cooked sufficiently to be crisp and to have sufficient stiffness to hold its form.

Certain types of Mexican foods, notably tacos, consist of a tortilla which normally is a flat, circular patty of corn meal batter or the like, formed while still in an uncooked or partially cooked state in which it still possesses sufficient pliability to be formed into a container of one form or another, then cooked to a hard, crisp consistency so as to retain this form, and then filled with a filling of ground meat and other ingredients. Most commonly, the tortilla patty is simply folded to form a U-shaped channel in cross-sectional contour, the channel being open at both ends. Most grocery stores have the uncooked or partially cooked tortillas readily available. Tacos of this form are notoriously difficult to eat neatly and without spillage on the clothing. The filling is usually loosely ground, so that it spills easily from either end of the tortilla, and moreover often contains free liquid, which readily drips from the tortilla. If the tortilla patty could be formed and cooked in the form of a hollow cone, much like an ice cream cone, the filling could be placed in the cone, and the entire tacos could be eaten from its upper end, consuming the tortilla and the filling simultaneously, also in much the same manner as an ice cream cone is eaten, with much greater convenience, and with much less likelihood of spillage or dripping of the filling on the user's clothing. However, the formation and cooking of tortilla cones from freshly mixed, unformed batter calls for equipment and skills not within the range of the average housewife, who ordinarily must start with tortillas already formed, or even partially cooked, in flat, circular patty shapes.

Accordingly, the principal object of the present invention is the provision of a mold which will form a common tortilla patty of flat, circular shape into a cone shape closed at its apex, and conveniently hold it in this form as it is cooked to its ultimate crisp consistency. Generally, this object is accomplished by a mold consisting of a hollow conical body member about which the tortilla may be wrapped while pliable so that opposed edges thereof overlap, a generally semiconical clamp member positioned to overlie the overlapping edge portions of the patty and urged resiliently thereagainst to hold the patty in position, and handle means whereby the mold may be suspended in a vessel of cooking fat. The body and clamp are formed of perforated material to allow free access of the cooking fat to both sides of the patty during cooking.

Other objects are extreme simplicity and economy of construction, efficiency and dependability of operation, and the provision of novel means for freeing the cooked tortilla from the mold body.

With these objects in view, as well as other objects which will appear in the course of the specification, reference will be had to the accompanying drawing wherein:

FIG. 1 is a front elevational view of a tortilla cone mold embodying the present invention, FIG. 2 is a side elevational view of the mold as shown in FIG. 1, FIG. 3 is a face view of a tortilla patty, FIG. 4 is an edge view of the patty, FIG. 5 is a fragmentary view similar to FIG. 2, but with the clamp extended and with a tortilla patty applied thereto in an initial step of the molding process, FIG. 6 is a sectional view taken on line VI—VI of FIG. 5, FIG. 7 is a fragmentary view similar to FIG. 1, but with a tortilla patty fully applied thereto, and FIG. 8 is an enlarged sectional view taken on line VIII—VIII of FIG. 7.

Like reference numerals apply to similar parts throughout the several views, wherein it will be seen that the cone mold for tortillas forming the subject matter of the present invention consists generally of a body member 2, a clamp 4, and a handle 6. Body member 2 consists of a sheet 8 of resilient metal formed in generally conical form, except that a slot 10 extending the full height of the cone is left open. The portion of said slot adjacent the apex of the cone is narrow and tapered as best shown in FIG. 6, while the portion of the slot adjacent the open end of the cone may be more widely flared as shown. Said body member has perforating holes 12 formed therethrough in closely and regularly spaced relation over substantially the entire area thereof, although it is preferred that none of said holes intersect the edges of sheet 8, in order to avoid the formation of sharp corners which could tear or otherwise damage a tortilla.

Clamp 4 is also formed of sheet metal, having perforations 14 in the same manner as body member 2, and is generally semiconical in form, being positioned to embrace one side of body cone 2 with its midline coinciding with slot 10 of the body cone 2. Said clamp embraces the apex of the body cone, but its vertical height may be less than half the height of the body cone. The diameter of the clamp is somewhat greater than that of the body cone, preferably to such a degree that the clamp will be generally coaxial with the body cone when a double thickness or tortilla patty is disposed therebetween, as shown in FIG. 8.

Handle 6 extends upwardly from the open end of the body cone, generally coaxially therewith and consists of a single length of spring wire bent to form a pair of generally parallel reaches 16 connected at their upper ends by a loop 18 of the wire and angled toward each other at their lower ends to intersect each other slidably adjacent the open end of the body cone. One end of the wire is affixed in any suitable manner to the interior surface of the body cone at a point diametrically opposite from slot 10, as indicated at 20, and the other end of the wire is affixed to the exterior surface of clamp 4, as indicated at 22. The handle wire is prestressed to bias the clamp yieldably against the body cone.

FIGS. 3 and 4 show a tortilla patty 24 of common form, being flat and circular. Such patties are commonly available in grocery stores, preformed but either uncooked or only partially cooked so as still to be pliable and capable of being rolled, folded or otherwise shaped.

In the use of the mold, a patty 24 is first laid against body cone 2 as best shown in FIGS. 5 and 6, or the body cone is laid on the patty, with a diameter of the patty lying along a generating line of the body cone diametrically opposite from slot 10. Preferably the patty should extend slightly past the apex of the body cone, for a reason to be discussed. The handle reaches 16 are then grasped and squeezed toward each other, whereby clamp 4 is moved away from body cone 2, as shown in FIG. 5, and the opposed lateral sides of patty 24 are then wrapped snugly about the body cone to overlap over slot 10 of the body cone, as shown in FIGS. 7 and 8, and handle reaches 16 are released, whereupon clamp 4 engages the overlapping portions of the patty to hold it firmly in position in the mold. The initial placement of the tortilla to extend slightly past the apex of the body cone insures that the cone form of the tortilla patty will be sealed closed at its apex to prevent drippage of liquid from the filling eventually placed in the tortilla cone. The flaring of the upper portion of slot 10 provides a convenient visual guide assisting in the proper placement of the tortilla patty in the mold. The mold is then suspended above a vessel of hot cooking fat so that body cone 2 and the tortilla patty carried is immersed in said fat to be cooked. Loop 18 of the handle may conveniently be engaged on a hook or the like disposed above the vessel. The perforations of the body cone and clamp provide easy access of the cooking fat to both sides of the patty, so that cooking of all portions of the patty will be uniform.

After the patty has been cooked to the desired degree, the mold and patty are removed from the vessel, excess cooking fat is drained away, and clamp 4 is released to free the tortilla cone from body cone 2. However, the cooking of the tortilla often may cause slight projections of the patty into perforation holes 12, such projections impeding the removal of the tortilla cone 2. Moreover, the tortilla cone itself at this time is quite hard, crisp, brittle, and easily crumbled or fractured, so that any impedance to its removal could easily cause breakage if special means were not provided to prevent it. In the present structure the slot 10 of the body cone permits the user to grasp said body cone above the tortilla and squeeze slightly to reduce the diameter thereof, since the body cone is formed of resilient metal, preferably stainless steel. This reduction of diameter permits the tortilla cone to be removed easily with no danger of breakage. The tortilla cone may then be filled with tacos filling or the like, and eaten neatly with no danger of spillage or dripping of the filling.

The proportions of body cone 2 perhaps merit some comment. The length of a generating line of said cone must of course be at least as great as the diameter of a tortilla patty 24 with which it is to be used. The "sealed" depth of the tortilla cone produced is measured by the distance from its apex to the height the opposed lateral edge portions of the patty overlap, or to the point 26 in FIG. 7, and cannot be as great as the depth of the cone at a point diametrically opposite from the overlap, if the patty is circular as shown. The capacity of the cone to hold a filling without spillage or dripping is a function of the described "sealed" depth thereof and its diameter at that depth. Increasing either of these dimensions, by changing the generating angle of the body cone, decreases the other dimension. It has been found that for a circular patty, a body cone 2 with a total included angle of about 30° produces a tortilla cone with both good capacity and a pleasing general appearance, although the exact angle used may of course be varied if desired.

What I claim as new and desire to protect by Letters Patent is:

1. A cone mold for tortilla patties comprising:
   a. an externally conical body member about which a pliable tortilla patty may be wrapped so that opposed edge portions thereof overlap each other from the apex of said body member to a point spaced apart from said apex,
   b. a clamp member which is internally generally semiconical, overlying said body member, generally coaxially therewith, from the apex of the latter to a point spaced apart from said apex, and
   c. means connecting said clamp to said body member to permit movement of the former toward and from the latter, and biasing said clamp yieldably toward said body member.

2. The structure as recited in claim 1 wherein said body member is hollow, and wherein the walls of both said body member and said clamp are perforated.

3. The structure as recited in claim 1 wherein said body member is formed of resilient material and has a slot formed therein extending from its apex through the open end thereof, whereby said body member may be resiliently compressed to reduce the diameter thereof.

4. The structure as recited in claim 3 wherein the central generating line of said semiconical clamp is aligned with the slot of said body member.

5. The structure as recited in claim 4 wherein both said body member and said clamp are formed of sheet metal and are perforated regularly over substantially the entire area thereof.

6. The structure as recited in claim 1 wherein said connecting means includes members projecting generally axially from said body member in a direction opposite from the apex thereof, said projecting members constituting means whereby said body member and clamp may be suspended in a cooking vessel.

7. The structure as recited in claim 1 wherein said connecting means comprises a length of spring wire in substantial U-form, said wire having a connecting portion remote from said body member and a pair of generally parallel legs extending toward the larger end of said body member, said legs being angled to intersect adjacent the larger end of the body member, and having their extreme ends affixed respectively to an interior surface of said body member and to an exterior surface of said clamp.